(12) United States Patent
Han et al.

(10) Patent No.: US 10,877,309 B2
(45) Date of Patent: Dec. 29, 2020

(54) LIQUID CRYSTAL DISPLAY DEVICE

(71) Applicant: LG Display Co., Ltd., Seoul (KR)

(72) Inventors: Sang-Dae Han, Paju-si (KR);
Sung-Rae Lee, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 16/195,205

(22) Filed: Nov. 19, 2018

(65) Prior Publication Data

US 2019/0163012 A1    May 30, 2019

(30) Foreign Application Priority Data

Nov. 30, 2017  (KR) ......................... 10-2017-0163577

(51) Int. Cl.
| G02F 1/1335 | (2006.01) |
| F21V 8/00 | (2006.01) |
| G02F 1/13357 | (2006.01) |
| G02F 1/1333 | (2006.01) |

(52) U.S. Cl.
CPC ..... *G02F 1/133528* (2013.01); *G02B 6/0088* (2013.01); *G02F 1/1336* (2013.01); *G02F 1/133512* (2013.01); *G02B 6/005* (2013.01); *G02F 2001/133317* (2013.01); *G02F 2201/08* (2013.01); *G02F 2202/28* (2013.01)

(58) Field of Classification Search
CPC ......... G02F 1/133528; G02F 1/133512; G02F 1/1336; G02F 2202/28; G02F 2201/08; G02F 2001/133317; G02B 6/0088; G02B 6/005

USPC ........................................................... 349/58
See application file for complete search history.

(56) References Cited

U.S. PATENT DOCUMENTS

2012/0262907 A1* 10/2012 Lee ...................... H05K 5/0017
                                                    362/97.1
2016/0135305 A1*  5/2016 Shin .................. G02F 1/133308
                                                    361/694

FOREIGN PATENT DOCUMENTS

| JP | 2015-129818 A | | 7/2015 |
| JP | 2017-120432 A | | 7/2017 |
| KR | 10-2017-0014076 A | | 2/2017 |
| KR | 20170014076 A | * | 2/2017 |
| KR | 10-2017-0050722 A | | 5/2017 |

* cited by examiner

*Primary Examiner* — Nathanael R Briggs
*Assistant Examiner* — William D Peterson
(74) *Attorney, Agent, or Firm* — Seed IP Law Group LLP

(57) ABSTRACT

A liquid crystal display device includes: a liquid crystal panel having first and second substrates and a liquid crystal layer between the first and second substrates; a first polarizing film and an optical film sequentially disposed on an outer surface of the first substrate; a backlight unit under the liquid crystal panel; a first frame under the backlight unit; a second frame surrounding a side surface of the backlight unit; a pad on the second frame; and an adhesive layer between the liquid crystal panel and the pad, wherein the optical film is separated from the pad, and wherein the first polarizing film overlaps the pad.

16 Claims, 3 Drawing Sheets

LIQUID CRYSTAL DISPLAY DEVICE

CROSS-REFERENCE TO RELATED APPLICATION

This application claims the benefit of priority of Korean Patent Application No. 2017-0163577, filed in the Republic of Korea on Nov. 30, 2017, which is hereby incorporated by reference in its entirety for all purposes as if fully set forth herein.

BACKGROUND

Technical Field

The present disclosure relates to a liquid crystal display device, and more particularly, to a liquid crystal display device where a light leakage and a light formation are reduced and a display quality and a design are improved by separating an optical film and a pad and by overlapping a polarizing film and a pad.

Description of the Related Art

Recently, as the information age rapidly progresses, display devices processing and displaying a large amount of information have advanced. For example, various flat panel displays (FPDs) having a thin profile, a light weight and a low power consumption have been researched.

As a result, a thin film transistor liquid crystal display (TFT-LCD) having an excellent color reproducibility and a thin profile has been developed. The LCD device displays an image using an optical anisotropy and a polarization property of a liquid crystal molecule.

The LCD device has been widely used for a portable terminal such as a smart phone or a tablet computer. To apply the LCD device to a portable terminal, an LCD device having a simplified structure has been suggested.

Figure 1:
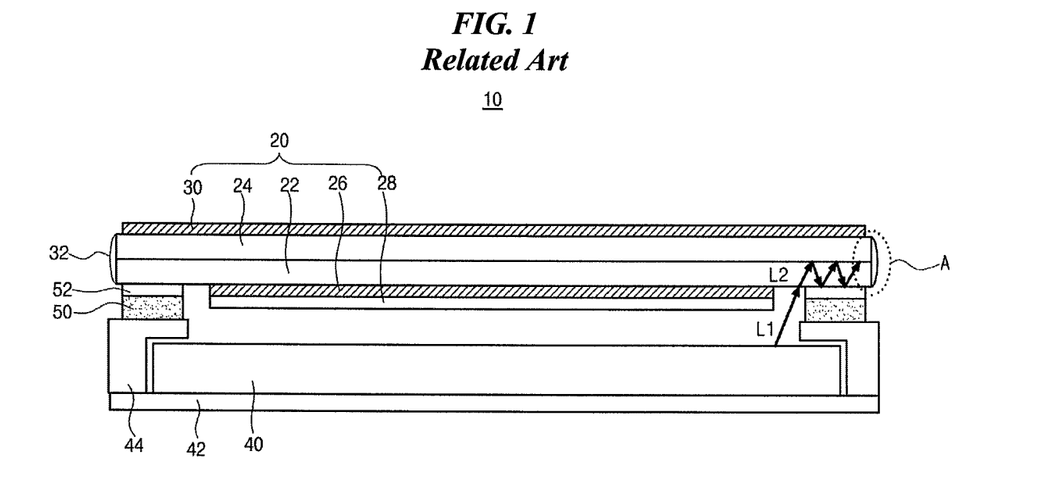
FIG. 1 is a cross-sectional view showing a liquid crystal display device according to the related art.

FIG. 1 is a cross-sectional view showing a liquid crystal display device according to the related art.

In FIG. 1, a liquid crystal display (LCD) device 10 according to the related art includes a liquid crystal panel 20, a backlight unit 40 and first and second frames 42 and 44. The liquid crystal panel 20 includes first and second substrates 22 and 24 facing and spaced apart from each other and a liquid crystal layer 25 (of FIG. 2) between the first and second substrates 22 and 24.

A first polarizing film 26 and an optical film 28 are sequentially disposed on an outer surface of the first substrate 22, and a second polarizing film 30 is disposed on an outer surface of the second substrate 24. A side sealant 32 is disposed on a side surface of the first and second substrates 22 and 24.

The backlight unit 40 is disposed under the liquid crystal panel 20 to supply a light to the liquid crystal panel 20.

The first and second frames 42 and 44 modularize the liquid crystal panel 20 and the backlight unit 40. The first frame 42 is disposed under the backlight unit 40, and the second frame 44 is disposed to surround a side surface of the backlight unit 40 and to be combined with the first frame 42.

The liquid crystal panel 20 is supported by the second frame 44. A pad 50 is disposed on the second frame 44 to absorb an impact and a vibration, and the liquid crystal panel 20 is attached to the second frame 44 through an adhesive layer 52.

In the LCD device 10 according to the related art, when the optical film 28 is disposed to overlap the pad 50, a gas is erupted from the optical film 28 to cause deterioration of the pad 50 such as a stain under a relatively high temperature circumstance. A display quality of the LCD device 10 is reduced by the deterioration of the pad 50.

To prevent the deterioration of the pad 50, in the LCD device 10, the first polarizing film 26 and the optical film 28 are disposed to be separated from the pad 50. When the first polarizing film 26 and the optical film 28 are separated from the pad 50, a light of the backlight unit 40 enters the first substrate 22 through a gap space between the first polarizing film 26 and the optical film 28 and the pad 50 to cause deterioration such as a light leakage and a light formation.

Figure 2:
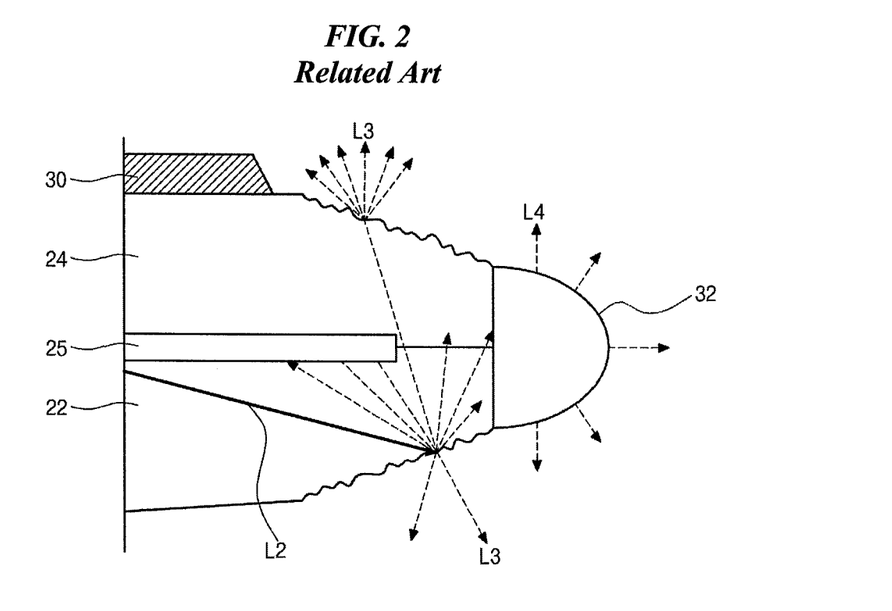
FIG. 2 is a magnified view of a portion A of FIG. 1.

FIG. 2 is a magnified view of a portion A of FIG. 1. Reference is made to FIG. 1 with FIG. 2.

In FIG. 2, after a first light L1 emitted from the backlight unit 40 enters the first substrate 22 through the gap space between the first polarizing film 26 and the optical film 28 and the pad 50, the first light L1 becomes a second light L2 which propagates in the first substrate 22 by total reflections at an interface between the first substrate 22 and the liquid crystal layer 25 and an interface between the first substrate 22 and the adhesive layer 52.

The second light L2 is emitted from an end slanting surface of the first and second substrates 22 and 24 to an exterior by scattering to cause deterioration such as a light leakage where the end slanting surface of the liquid crystal panel 20 is shown brightly.

In addition, the second light L2 is emitted from the side sealant 32 on the side surface of the first and second substrates 22 and 24 to the exterior to cause deterioration such as a light formation where an end side surface of the liquid crystal panel 20 is shown brightly.

A display quality and a design of the LCD device 10 are deteriorated by the light leakage and the light formation.

BRIEF SUMMARY

Aspects of the present disclosure relate to a liquid crystal display device.

One or more aspects of the present disclosure relate to a liquid crystal display device where a light leakage and a light formation are reduced and a display quality and a design are improved by separating an optical film and a pad and by overlapping a polarizing film and a pad.

One or more aspects of the present disclosure relate to a liquid crystal display device where a total reflection of an incident light is adjusted by a first substrate and an adhesive having the same refractive index as each other.

One or more aspects of the present disclosure relate to a liquid crystal display device where an incident light is reduced by a black pattern layer under a first polarizing film or a first substrate.

To achieve these and other aspects of the inventive concepts, as embodied and broadly described, a liquid crystal display device includes: a liquid crystal panel having first and second substrates and a liquid crystal layer between the first and second substrates; a first polarizing film and an optical film sequentially disposed on an outer surface of the first substrate; a backlight unit under the liquid crystal panel; a first frame under the backlight unit; a second frame surrounding a side surface of the backlight unit; a pad on the second frame; and an adhesive layer between the liquid crystal panel and the pad, wherein the optical film is separated from the pad, and wherein the first polarizing film overlaps the pad.

Advantages and features of the disclosure will be set forth in part in the description, which follows and in part will become apparent to those having ordinary skill in the art upon examination of the following or may be learned from practice of the disclosure. Other advantages and features of the aspects herein may be realized and attained by the structure particularly pointed out in the written description and claims hereof as well as the appended drawings.

It is to be understood that both the foregoing general description and the following detailed description are explanatory, and are intended to provide further explanation of the aspects as claimed.

BRIEF DESCRIPTION OF THE SEVERAL VIEWS OF THE DRAWINGS

The accompanying drawings, which are included to provide a further understanding of the disclosure, are incorporated in and constitute a part of this specification, illustrate implementations of the disclosure and together with the description serve to explain the principles of aspects of the disclosure. The various features and layers in the drawings are not necessarily drawn to scale, and some are shown enlarged relative to others to more easily illustrate particular layers or features.

In the drawings.

DETAILED DESCRIPTION

Reference will now be made in detail to aspects of the present disclosure, examples of which are illustrated in the accompanying drawings. In the following description, when a detailed description of well-known functions or configurations related to this document is determined to unnecessarily cloud a gist of an aspect of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 3:
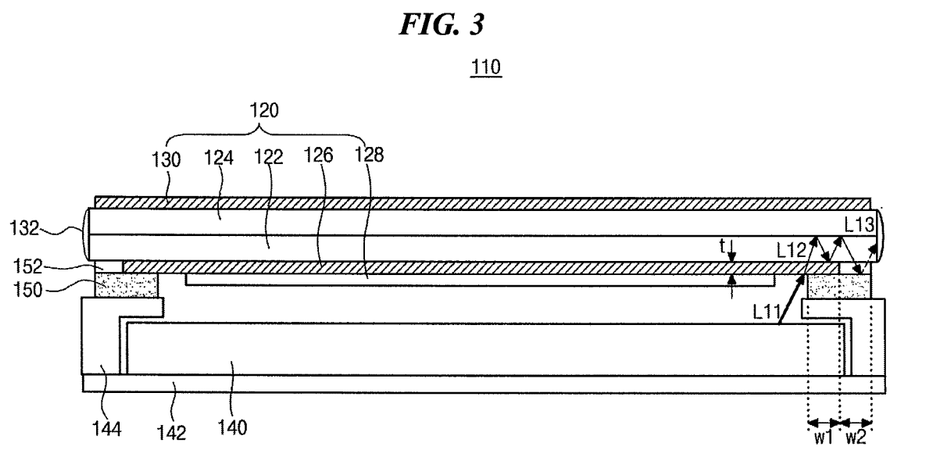
FIG. 3 is a cross-sectional view showing a liquid crystal display device according to a first embodiment of the present disclosure.

FIG. 3 is a cross-sectional view showing a liquid crystal display device according to a first embodiment of the present disclosure.

In FIG. 3, a liquid crystal display (LCD) device 110 according to a first embodiment of the present disclosure includes a liquid crystal panel 120, a backlight unit 140 and first and second frames 142 and 144.

The liquid crystal panel 120 includes first and second substrates 122 and 124 facing and spaced apart from each other and a liquid crystal layer (not shown) between the first and second substrates 122 and 124.

Although not shown, a gate line and a data line may be disposed on an inner surface of the first substrate 122. The gate line and the data line may cross each other to define a pixel region. A thin film transistor (TFT) and a pixel electrode may be disposed in the pixel region. The TFT may be connected to the gate line and the data line, and the pixel electrode may be connected to the TFT.

A common electrode may be disposed on an inner surface of the second substrate 124.

A first polarizing film 126 and an optical film 128 are sequentially disposed on an outer surface of the first substrate 122, and a second polarizing film 130 is disposed on an outer surface of the second substrate 124. A side sealant 132 is disposed on a side surface of the first and second substrates 122 and 124.

The optical film 128 diffuses and collimates a light supplied by the backlight unit 140 to improve a uniformity of the light. The optical film 128 may include a plurality of diffusing sheets and a plurality of collimating sheets.

The first polarizing film 126 selectively transmits a light of a predetermined polarization component among the non-polarized light through the optical film 128, and the second polarizing film 130 selectively transmits a light of a predetermined polarization component among the light through the first polarizing film 126 and the liquid crystal layer. Polarization axes of the first and second optical films 126 and 130 may be perpendicular to or may be parallel to each other.

The first polarizing film 126 and the optical film 128 may be formed as an integrated unit.

The side sealant 132 protects a side surface of the first and second substrates 122 and 124 exposed to an exterior.

The backlight unit 140 is disposed under the liquid crystal panel 120 to supply a light to the liquid crystal panel 120.

Although not shown, the backlight unit 140 of an edge type may include a light source at an edge portion of the liquid crystal panel 120 and a light guide plate directly under the liquid crystal panel 120. The light source may emit a light, and the light guide plate may convert the light of the light source to a plane light. In addition, the backlight unit 140 of a direct type may include a plurality of light sources directly under the liquid crystal panel 120 and a diffusing plate over the plurality of light sources. The plurality of light sources may emit a light, and the diffusing plate may improve a uniformity of the light of the plurality of light sources.

The first and second frames 142 and 144 modularize the liquid crystal panel 120 and the backlight unit 140.

The first frame 142 may be referred to as a cover bottom or a bottom cover and may have a plate shape. The first frame 142 is disposed under the backlight unit 140.

The second frame 144 may be referred to as a guide panel, a main support, a mold frame or a middle cabinet and may have a rectangular ring shape having a bent portion thereof. The second frame 144 is disposed to surround a side surface of the backlight unit 140 and to be combined with the first frame 142.

The liquid crystal panel 120 is supported by the second frame 144. A pad 150 is disposed on the bend portion of the second frame 144 to absorb an impact and a vibration, and an adhesive layer 152 is disposed on the pad 150. The liquid crystal panel 120 is attached to the bent portion of the second frame 144 through the adhesive layer 152 and the pad 150.

The pad 150 and the adhesive layer 152 may be disposed along four sides of the liquid crystal panel 120.

The optical film 128 is disposed to be separated from the pad 150 such that the optical film 128 does not contact the pad 150. The first polarizing film 126 is disposed to overlap the pad 150 such that the first polarizing film 126 contacts the pad 150.

The pad 150 may overlap the first polarizing film 126 by a first width w1 and may be exposed outside the first polarizing film 126 by a second width w2. As a result, a portion of the pad 150 corresponding to the second width w2 does not overlap the first polarizing film 126.

The adhesive layer 152 is disposed between the portion of the pad 150 corresponding to the second width w2 and the first substrate 122. In another embodiment, the adhesive layer 152 may be further disposed between a portion of the pad 150 corresponding to the first width w1 and the first polarizing film 126.

Since the first polarizing film 126 extends and is disposed between the pad 150 and the first substrate 122 to overlap the pad by the first width w1, about 50% of a first light L11 emitted from the backlight unit 140 and passing through a gap space between the optical film 128 and the pad 150 is attenuated by the first polarizing film 126. As a result, an attenuated second light L12 enters the first substrate 122.

A ratio w1:w2 of the first and second widths w1 and w2 may be selected taking into account an attenuation rate by the first polarizing film 126 and an attachment force by the adhesive layer 152.

For example, when the ratio w1:w2 of the first and second widths w1 and w2 for the first polarizing film 126 having a thickness of about 60 μm is 6:4 or 7:3, the first light L11 is attenuated and at the same time the liquid crystal panel 120 and the second frame 144 are attached to each other with a sufficient attachment force. When the ratio w1:w2 of the first and second widths w1 and w2 for the first polarizing film 126 having a thickness of about 60 μm is 8:2, the first light L11 is attenuated but the attachment force between the liquid crystal panel 120 and the second frame 144 might be reduced such that the LCD device 110 is not maintained. In such cases, a stronger adhesive might be used, the ratio of w1 to w2 can be reduced, a thinner polarizing layer 126 might be used or other steps taken.

As a result, the first width w1 of an overlapping region of the first polarizing film 126 and the pad 150 may be equal to or smaller than about 70% of a sum w1+w2 of the first and second widths w1 and w2 of the pad 150.

In addition, the overlapping region of the first polarizing film 126 and the pad 150 may located on at least one of four sides of the liquid crystal panel 120. In some embodiments, the overlapping region is on two sides, while in other embodiments, it is on all four sides.

For example, when the optical film 128 includes a prism pattern of a single layer along a horizontal direction of a front view of the liquid crystal panel 120, the overlapping region of the first polarizing film 126 and the pad 150 may be disposed at the left and right sides of the liquid crystal panel 120 with the first width of about 0.05 mm. When the optical film 128 includes a prism pattern of a single layer along a vertical direction of a front view of the liquid crystal panel 120, the overlapping region of the first polarizing film 126 and the pad 150 may be disposed at the upper and lower sides of the liquid crystal panel 120 with the first width of about 0.05 mm.

When the optical film 128 includes a prism pattern of a double layer along horizontal and vertical directions of a front view of the liquid crystal panel 120, the overlapping region of the first polarizing film 126 and the pad 150 may be disposed at the left, right, upper and lower sides of the liquid crystal panel 120 with the first width of about 0.05 mm.

As the thickness t of the first polarizing film 126 increases, the attachment force of the adhesive layer 152 is reduced under a high temperature and high humidity circumstance. For example, when the thickness t of the first polarizing film 126 is about 60 μm or about 100 μm for the ratio w1:w2 of 7:3, the adhesive layer 152 has a sufficient attachment force for long term reliability even under a high temperature and high humidity circumstance. When the thickness t of the first polarizing film 126 is about 120 μm for the ratio w1:w2 of 7:3, the attachment force of the adhesive layer 152 is reduced under a high temperature and high humidity circumstance such that the liquid crystal panel 120 might become detached from the second frame 144 over time and with long use.

As a result, the thickness t of the first polarizing film 126 may be equal to or smaller than about 100 μm.

Since a refractive index na of the adhesive layer 152 and a refractive index ns of the first substrate 122 are substantially the same as each other (na~ns), the second light L12 propagating in the first substrate 122 is not totally reflected at an interface between the first substrate 122 and the adhesive layer 152 and straightly propagates to enter an interface between the adhesive layer 152 and the pad 150.

Since a light absorbency of the pad 150 is greater than a light absorbency of the first substrate 122 or the adhesive layer 152, the second light L12 is attenuated to about 7% of the first light L11 at the interface between the adhesive layer 152 and the pad 150 to become a third light L13. The attenuated third light L13 propagates in the first substrate 122 to reach the side sealant 132.

In the LCD device 110 according to the first embodiment of the present disclosure, about 57% of the first light L11 entering the gap space between the optical film 128 and the pad 150 is attenuated due to the first polarizing film 126 overlapping the pad 150 and the adhesive layer 152 having the same refractive index as the first substrate 122, and the third light L13 which is a very low percentage of the first light L11 reaches the end portion of the liquid crystal panel 120. Accordingly, deterioration such as a light leakage and a light formation is greatly reduced and a display quality and a design of the LCD device 110 are improved.

Although the second light L12 is not totally reflected to propagate straightly at the interface between the first substrate and the adhesive layer 152 by forming the adhesive layer 122 to include a material having the same refractive index as the first substrate 122 in the first embodiment, the second light L12 may be further attenuated in the adhesive layer 152 by adding an light absorbent material such as carbon or black ink to the adhesive layer 152 in another embodiment.

For example, when the first substrate 122 has a refractive index of about 1.5 and the adhesive layer 152 has a refractive index of about 1.49, a leakage attenuation rate (e.g., (L12-L13)/L13) defined by a rate of an attenuation amount of light due to the first polarizing film 126, the adhesive layer 152 and the pad 150 with respect to a total leakage amount of light emitted from the liquid crystal panel 120 to the exterior may be about 16%. When the first substrate 122 has a refractive index of about 1.5 and the adhesive layer 152 has a refractive index of about 1.51, a leakage attenuation rate may be about 18%. When the first substrate 122 has a refractive index of about 1.5 and a light absorbent material is added to the adhesive layer 152 having a refractive index of about 1.51, a leakage attenuation rate may be about 52%. A higher leakage attenuation percentage means that more light is being attenuated and a lower percentage of the leakage light is reaching the end 132.

In the LCD device 110 according to the first embodiment of the present disclosure, since the first polarizing film 126 extends outwardly and is disposed between the pad 150 and the first substrate 122 to overlap the pad 150, the light emitted from the backlight unit 140 and entering the gap space between the optical film 128 and the pad 150 is attenuated by the first polarizing film 126. In addition, since the refractive index of the adhesive layer 152 is the same as the refractive index of the first substrate 122, the light propagates straightly in the first substrate 122 without a total reflection at the interface between the first substrate 122 and the adhesive layer 152 to be attenuated by the pad 150. As a result, deterioration such as a light leakage and a light formation is reduced, and a display quality and a design of the LCD device 110 are improved.

In another embodiment, a light leakage and a light formation may be further reduced by disposing a black pattern under a first polarizing film in a gap space between an optical film and a pad.

Figure 4:
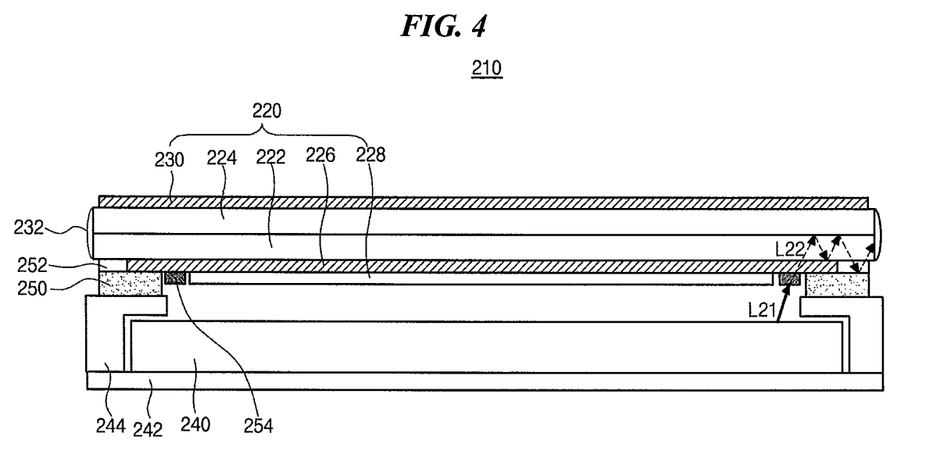
FIG. 4 is a cross-sectional view showing a liquid crystal display device according to a second embodiment of the present disclosure.

FIG. 4 is a cross-sectional view showing a liquid crystal display device according to a second embodiment of the present disclosure. Illustration on a part the same as the first embodiment will be omitted.

In FIG. 4, a liquid crystal display (LCD) device 210 according to a second embodiment of the present disclosure includes a liquid crystal panel 220, a backlight unit 240 and first and second frames 242 and 244.

The liquid crystal panel 220 includes first and second substrates 222 and 224 facing and spaced apart from each other and a liquid crystal layer (not shown) between the first and second substrates 222 and 224.

Although not shown, a gate line and a data line may be disposed on an inner surface of the first substrate 222. The gate line and the data line may cross each other to define a pixel region. A thin film transistor (TFT) and a pixel electrode may be disposed in the pixel region. The TFT may be connected to the gate line and the data line, and the pixel electrode may be connected to the TFT. A common electrode may be disposed on an inner surface of the second substrate 224.

A first polarizing film 226 and an optical film 228 are sequentially disposed on an outer surface of the first substrate 222, and a second polarizing film 230 is disposed on an outer surface of the second substrate 224. A side sealant 232 is disposed on a side surface of the first and second substrates 222 and 224.

The optical film 228 diffuses and collimates a light supplied by the backlight unit 240 to improve a uniformity of the light. The optical film 228 may include a plurality of diffusing sheets and a plurality of collimating sheets.

The first polarizing film 226 selectively transmits a light of a predetermined polarization component among the non-polarized light through the optical film 228, and the second polarizing film 230 selectively transmits a light of a predetermined polarization component among the light through the first polarizing film 226 and the liquid crystal layer. Polarization axes of the first and second optical films 226 and 230 may be perpendicular to or may be parallel to each other.

The first polarizing film 226 and the optical film 228 may be formed as an integrated unit.

The side sealant 232 protects a side surface of the first and second substrates 222 and 224 exposed to an exterior.

The backlight unit 240 is disposed under the liquid crystal panel 220 to supply a light to the liquid crystal panel 220.

Although not shown, the backlight unit 240 of an edge type may include a light source at an edge portion of the liquid crystal panel 220 and a light guide plate directly under the liquid crystal panel 220. The light source may emit a light, and the light guide plate may convert the light of the light source to a plane light. In addition, the backlight unit 240 of a direct type may include a plurality of light sources directly under the liquid crystal panel 220 and a diffusing plate over the plurality of light sources. The plurality of light sources may emit a light, and the diffusing plate may improve a uniformity of the light of the plurality of light sources.

The first and second frames 242 and 244 modularize the liquid crystal panel 220 and the backlight unit 240.

The first frame 242 may be referred to as a cover bottom or a bottom cover and may have a plate shape. The first frame 242 is disposed under the backlight unit 240.

The second frame 244 may be referred to as a guide panel, a main support, a mold frame or a middle cabinet and may have a rectangular ring shape having a bent portion thereof. The second frame 244 is disposed to surround a side surface of the backlight unit 240 and to be combined with the first frame 242.

The liquid crystal panel 220 is supported by the second frame 244. A pad 250 is disposed on the bend portion of the second frame 244 to absorb an impact and a vibration, and an adhesive layer 252 is disposed on the pad 250. The liquid crystal panel 220 is attached to the bent portion of the second frame 244 through the adhesive layer 252 and the pad 250.

The pad 250 and the adhesive layer 252 may be disposed along four sides of the liquid crystal panel 220.

The optical film 228 is disposed to be separated from the pad 250 such that the optical film 228 does not contact the pad 250. The first polarizing film 226 is disposed to overlap the pad 250 such that the first polarizing film 226 contacts the pad 250.

The pad 250 may overlap the first polarizing film 226 by a first width w1 (of FIG. 3) and may be exposed outside the first polarizing film 226 by a second width w2 (of FIG. 3). As a result, a portion of the pad 250 corresponding to the second width w2 does not overlap the first polarizing film 226.

The adhesive layer 252 is disposed between the portion of the pad 250 corresponding to the second width w2 and the first substrate 222. In another embodiment, the adhesive layer 252 may be further disposed between a portion of the pad 250 corresponding to the first width w1 and the first polarizing film 226.

A black pattern layer 254 is disposed under the first polarizing film 226 corresponding to a gap space between the optical film 228 and the pad 250. The black pattern layer 254 may have a width equal to or smaller than about 0.05 mm.

Since the first polarizing film 226 extends and is disposed between the pad 250 and the first substrate 222 to overlap the pad by the first width w1, and the black pattern layer 254 is disposed under the first polarizing film 226 corresponding to the gap space between the optical film 228 and the pad 250, over about 60% of a first light L21 emitted from the backlight unit 240 and passing through the gap space between the optical film 228 and the pad 250 is attenuated by the first polarizing film 226. As a result, an attenuated second light L22 enters the first substrate 222.

For example, a leakage attenuation rate defined by a rate of an attenuation amount of light due to the first polarizing film 226 and the black pattern layer 254 with respect to a total leakage amount of light emitted from the liquid crystal panel 220 of the LCD device 210 according to the second embodiment to the exterior may be about 41%.

Since a refractive index na of the adhesive layer 252 and a refractive index ns of the first substrate 222 are substantially the same as each other (na~ns), the second light L22 propagating in the first substrate 222 is not totally reflected at an interface between the first substrate 222 and the adhesive layer 252 and straightly propagates to enter an interface between the adhesive layer 252 and the pad 250.

Since a light absorbency of the pad 250 is greater than a light absorbency of the first substrate 222 or the adhesive layer 252, the second light L22 is attenuated to about 7% of the first light L21 at the interface between the adhesive layer 252 and the pad 250 to become a third light (not shown). The attenuated third light L13 propagates in the first substrate 222.

In the LCD device 210 according to the second embodiment of the present disclosure, since the first polarizing film 226 extends outwardly and is disposed between the pad 250 and the first substrate 222 to overlap the pad 250, and the black pattern layer 254 is disposed under the first polarizing film 226 corresponding to the gap space between the optical film 228 and the pad 250, the light emitted from the backlight unit 240 and entering the gap space between the optical film 228 and the pad 250 is attenuated by the first polarizing film 226 and the black pattern layer 254. As a result, deterioration such as a light leakage and a light formation is reduced and a display quality and a design of the LCD device 210 are improved.

In another embodiment, a light leakage and a light formation may be further reduced by disposing a black pattern between a first substrate and an adhesive layer.

Figure 5:
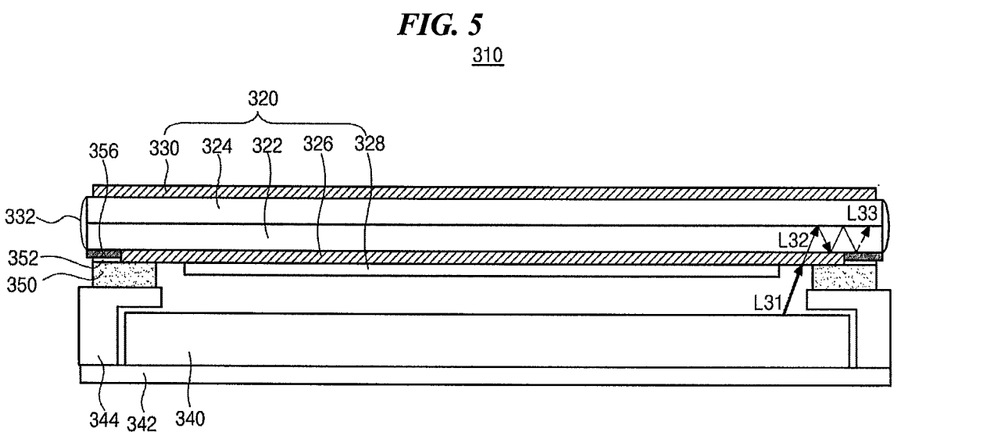
FIG. 5 is a cross-sectional view showing a liquid crystal display device according to a third embodiment of the present disclosure.

FIG. 5 is a cross-sectional view showing a liquid crystal display device according to a third embodiment of the present disclosure. Illustration on a part the same as the first and second embodiments will be omitted.

In FIG. 5, a liquid crystal display (LCD) device 310 according to a third embodiment of the present disclosure includes a liquid crystal panel 320, a backlight unit 340 and first and second frames 342 and 344.

The liquid crystal panel 320 includes first and second substrates 322 and 324 facing and spaced apart from each other and a liquid crystal layer (not shown) between the first and second substrates 322 and 324.

Although not shown, a gate line and a data line may be disposed on an inner surface of the first substrate 322. The gate line and the data line may cross each other to define a pixel region. A thin film transistor (TFT) and a pixel electrode may be disposed in the pixel region. The TFT may be connected to the gate line and the data line, and the pixel electrode may be connected to the TFT. A common electrode may be disposed on an inner surface of the second substrate 324.

A first polarizing film 326 and an optical film 328 are sequentially disposed on an outer surface of the first substrate 322, and a second polarizing film 330 is disposed on an outer surface of the second substrate 324. A side sealant 232 is disposed on a side surface of the first and second substrates 322 and 324.

The optical film 328 diffuses and collimates a light supplied by the backlight unit 340 to improve a uniformity of the light. The optical film 328 may include a plurality of diffusing sheets and a plurality of collimating sheets.

The first polarizing film 326 selectively transmits a light of a predetermined polarization component among the non-polarized light through the optical film 328, and the second polarizing film 330 selectively transmits a light of a predetermined polarization component among the light through the first polarizing film 326 and the liquid crystal layer.

Polarization axes of the first and second optical films 326 and 330 may be perpendicular to or may be parallel to each other.

The first polarizing film 326 and the optical film 328 may be formed as an integrated unit.

The side sealant 332 protects a side surface of the first and second substrates 322 and 324 exposed to an exterior.

The backlight unit 340 is disposed under the liquid crystal panel 320 to supply a light to the liquid crystal panel 320.

Although not shown, the backlight unit 340 of an edge type may include a light source at an edge portion of the liquid crystal panel 320 and a light guide plate directly under the liquid crystal panel 320. The light source may emit a light, and the light guide plate may convert the light of the light source to a plane light. In addition, the backlight unit 340 of a direct type may include a plurality of light sources directly under the liquid crystal panel 320 and a diffusing plate over the plurality of light sources. The plurality of light sources may emit a light, and the diffusing plate may improve a uniformity of the light of the plurality of light sources.

The first and second frames 342 and 344 modularize the liquid crystal panel 320 and the backlight unit 340.

The first frame 342 may be referred to as a cover bottom or a bottom cover and may have a plate shape. The first frame 342 is disposed under the backlight unit 340.

The second frame 344 may be referred to as a guide panel, a main support, a mold frame or a middle cabinet and may have a rectangular ring shape having a bent portion thereof. The second frame 344 is disposed to surround a side surface of the backlight unit 340 and to be combined with the first frame 342.

The liquid crystal panel 320 is supported by the second frame 344. A pad 350 is disposed on the bend portion of the second frame 344 to absorb an impact and a vibration, and an adhesive layer 352 is disposed on the pad 350. The liquid crystal panel 320 is attached to the bent portion of the second frame 344 through the adhesive layer 352 and the pad 350.

The pad 350 and the adhesive layer 352 may be disposed along four sides of the liquid crystal panel 320.

The optical film 328 is disposed to be separated from the pad 350 such that the optical film 328 does not contact the pad 350. The first polarizing film 326 is disposed to overlap the pad 350 such that the first polarizing film 326 contacts the pad 350.

The pad 350 may overlap the first polarizing film 326 by a first width w1 (of FIG. 3) and may be exposed outside the first polarizing film 326 by a second width w2 (of FIG. 3). As a result, a portion of the pad 350 corresponding to the second width w2 does not overlap the first polarizing film 326.

The adhesive layer 352 is disposed between the portion of the pad 350 corresponding to the second width w2 and the first substrate 322. In another embodiment, the adhesive layer 352 may be further disposed between a portion of the pad 350 corresponding to the first width w1 and the first polarizing film 326.

A black pattern layer 356 is disposed between the first substrate 322 and the adhesive layer 352.

Since the first polarizing film 326 extends and is disposed between the pad 350 and the first substrate 322 to overlap the pad by the first width w1, about 50% of a first light L31 emitted from the backlight unit 340 and passing through a gap space between the optical film 328 and the pad 350 is attenuated by the first polarizing film 326. As a result, an attenuated second light L32 enters the first substrate 322. In addition, since the black pattern layer 356 is disposed between the first substrate 322 and the adhesive layer 352, the second light L32 propagating in the first substrate 322 is attenuated by the black pattern layer 356 to become a third light L33. As a result, the attenuated third light L33 propagates in the first substrate 322 to reach the side sealant 332.

For example, a leakage attenuation rate defined by a rate of an attenuation amount of light due to the first polarizing film 326 and the black pattern layer 356 with respect to a total leakage amount of light emitted from the liquid crystal panel 320 of the LCD device 310 according to the third embodiment to the exterior may be about 74%.

In the LCD device 310 according to the third embodiment of the present disclosure, since the first polarizing film 326 extends outwardly and is disposed between the pad 350 and the first substrate 322 to overlap the pad 350, and the black pattern layer 356 is disposed between the first substrate 322 and the adhesive layer 352, the light emitted from the backlight unit 340 and entering the gap space between the optical film 328 and the pad 350 is attenuated by the first polarizing film 326, and the light propagating in the first substrate 322 is attenuated by the black pattern layer 356. As a result, deterioration such as a light leakage and a light formation is reduced and a display quality and a design of the LCD device 310 are improved.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A liquid crystal display device, comprising:
   a liquid crystal panel having a first substrate with an outer surface and a side surface and a second substrate on the first substrate;
   a liquid crystal layer between the first and second substrates;
   a first polarizing film disposed on the outer surface of the first substrate and having an outer surface;
   an optical film disposed on the outer surface of the first polarizing film;
   a backlight unit under the liquid crystal panel and having a side surface;
   a first frame under the backlight unit;
   a second frame adjacent to the side surface of the backlight unit;
   a pad on the second frame having a first light absorbency, the first polarizing film being positioned on and overlapping the pad; and
   a space between the pad and the optical film;
   an adhesive layer between the liquid crystal panel and the pad, the adhesive layer disposed between the first polarizing film and the side surface of the first substrate and having a second light absorbency; and
   a black pattern layer directly contacting the first polarizing film and positioned in the space between the optical film and the pad,
   wherein the first light absorbency of the pad is greater than the second light absorbency of the adhesive layer to attenuate light at an interface between the adhesive layer and the pad.

2. The liquid crystal display device of claim 1, wherein a width of an overlapping region of the first polarizing film and the pad is equal to or smaller than 70% of a width of the pad.

3. The liquid crystal display device of claim 1, wherein a thickness of the first polarizing film is equal to or smaller than 100 μm.

4. The liquid crystal display device of claim 1, wherein a refractive index of the adhesive layer is a same as a refractive index of the first substrate.

5. The liquid crystal display device of claim 1, wherein the adhesive layer includes a light absorbent material.

6. The liquid crystal display device of claim 5, wherein a leakage attenuation rate defined by a rate of an attenuation amount of light due to the first polarizing film, the adhesive layer and the pad with respect to a total leakage amount of light emitted from the liquid crystal panel is greater than 50%.

7. The liquid crystal display device of claim 1, wherein the optical film includes a prism pattern of a single layer along a horizontal direction and an overlapping region of the first polarizing film and the pad is positioned on the left and right sides of the liquid crystal panel.

8. The liquid crystal display device of claim 1, wherein the optical film includes a prism pattern of a single layer along a vertical direction and an overlapping region of the first polarizing film and the pad is positioned on the upper and lower sides of the liquid crystal panel.

9. The liquid crystal display device of claim 1, wherein the optical film includes a prism pattern of a double layer along horizontal and vertical directions and an overlapping region of the first polarizing film and the pad is positioned on the left, right, upper and lower sides of the liquid crystal panel.

10. The liquid crystal display device of claim 1, wherein a leakage attenuation rate defined by a rate of an attenuation amount of light due to the first polarizing film and the black pattern layer with respect to a total leakage amount of light emitted from the liquid crystal panel is 41%.

11. A liquid crystal display device, comprising:
    a liquid crystal panel including a first substrate with an outer surface and a side surface and a second substrate disposed on the first substrate;
    a liquid crystal layer between the first and second substrates;
    a first polarizing film disposed on the outer surface of the first substrate, the first polarizing film having an outer surface;
    an optical film disposed on the outer surface of the first polarizing film;
    a backlight unit under the liquid crystal panel and having a side surface;

a first frame under the backlight unit;
a second frame adjacent to the side surface of the backlight unit;
a pad on the second frame having a first light absorbency, the pad being spaced from the optical film and the first polarizing film being positioned on and overlapping the pad;
an adhesive layer between the liquid crystal panel and the pad, the adhesive layer disposed between the first polarizing film and the side surface of the first substrate and having a second light absorbency; and
a black pattern layer between the first substrate and the adhesive layer, the black pattern layer directly contacting the first substrate and disposed between the first polarizing film and the side surface of the first substrate,
wherein the first light absorbency of the pad is greater than the second light absorbency of the adhesive layer to attenuate light at an interface between the adhesive layer and the pad.

12. The liquid crystal display device of claim 11, wherein a leakage attenuation rate defined by a rate of an attenuation amount of light due to the first polarizing film and the black pattern layer with respect to a total leakage amount of light emitted from the liquid crystal panel is 74%.

13. A liquid crystal display device, comprising:
a liquid crystal panel having a first substrate with an outer surface and a side surface and a second substrate;
a liquid crystal layer between the first and second substrates;
a backlight unit under the liquid crystal panel and having a side surface;
a first frame under the backlight unit;
a second frame adjacent to the side surface of the backlight unit;
a pad on the second frame having a first light absorbency;
a first polarizing film positioned on the pad and located between the outer surface of the first substrate and the pad of the second frame, the first polarizing film having an outer surface;
an optical film disposed on the outer surface of the first polarizing film;
a space between the pad and the optical film;
an adhesive layer between the liquid crystal panel and the pad, the adhesive layer disposed between the first polarizing film and the side surface of the first substrate and having a second light absorbency; and
a black pattern layer directly contacting the first polarizing film and positioned in the space between the optical film and the pad,
wherein the first light absorbency of the pad is greater than the second light absorbency of the adhesive layer to attenuate light at an interface between the adhesive layer and the pad.

14. The liquid crystal display device of claim 13 further including an adhesive layer position adjacent to the first polarizing film and between the second frame and the outer surface of the first substrate.

15. The liquid crystal display device of claim 14 wherein the adhesive layer is comprised of a light absorbing material.

16. The liquid crystal display device of claim 13 wherein the area of the pad in contact with the first polarizing film is less than 70% and the area of the pad in contact with the adhesive layer is greater than 30%.

* * * * *

UNITED STATES PATENT AND TRADEMARK OFFICE
CERTIFICATE OF CORRECTION

PATENT NO. : 10,877,309 B2  
APPLICATION NO. : 16/195205  
DATED : December 29, 2020  
INVENTOR(S) : Sang-Dae Han et al.

Page 1 of 1

It is certified that error appears in the above-identified patent and that said Letters Patent is hereby corrected as shown below:

In the Claims

Column 12, Claim 1, Line 3:
"the pad; and" should read: -- the pad; --.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*